(12) United States Patent
Chung

(10) Patent No.: US 10,738,831 B2
(45) Date of Patent: Aug. 11, 2020

(54) TRANSMISSION COMPONENT AND PRINTER

(71) Applicant: HON HAI PRECISION INDUSTRY CO., LTD., New Taipei (TW)

(72) Inventor: Ming-Hung Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 541 days.

(21) Appl. No.: 15/585,294

(22) Filed: May 3, 2017

(65) Prior Publication Data

US 2018/0259000 A1  Sep. 13, 2018

(30) Foreign Application Priority Data

Mar. 13, 2017 (CN) .......................... 2017 1 0146510

(51) Int. Cl.
| | |
|---|---|
| *F16D 1/00* | (2006.01) |
| *F16D 1/10* | (2006.01) |
| *F16H 57/00* | (2012.01) |
| *B41J 29/02* | (2006.01) |
| *B41J 29/13* | (2006.01) |

(52) U.S. Cl.
CPC .............. *F16D 1/101* (2013.01); *B41J 29/02* (2013.01); *B41J 29/13* (2013.01); *F16H 57/0025* (2013.01); *F16D 2001/102* (2013.01)

(58) Field of Classification Search
CPC .............. F16D 1/101; F16D 2001/102; F16H 57/0025; B41J 29/13; B41J 29/02; B41J 23/02
See application file for complete search history.

(56) References Cited

U.S. PATENT DOCUMENTS

| | | | | |
|---|---|---|---|---|
| 5,096,315 | A * | 3/1992 | Yamamoto ............... | B41J 33/22 400/221.2 |
| 5,876,130 | A * | 3/1999 | Lee ......................... | B41J 33/18 400/216.1 |
| 6,039,477 | A * | 3/2000 | Matsuura ................. | B41J 33/16 400/236 |
| 7,574,936 | B2 * | 8/2009 | Takada .................... | F16H 48/08 74/355 |
| 2016/0154376 | A1 * | 6/2016 | Xiao ................. | G03G 21/1857 399/111 |

* cited by examiner

*Primary Examiner* — Victor L MacArthur
(74) *Attorney, Agent, or Firm* — ScienBiziP, P.C.

(57) ABSTRACT

A transmission component acting as a safety device in a printer for the safety of a print operator includes a gear portion, a transmission shaft, and a resilient member. One end of the gear portion defines a receiving space, the transmission component and the resilient member are received in the receiving space. The resilient member bears against the bottom end of the receiving space and the transmission shaft. The resilient member is elastically deformed to slide in the receiving space if operator or limb of operator is detected during loading procedure.

6 Claims, 6 Drawing Sheets

TRANSMISSION COMPONENT AND PRINTER

CROSS-REFERENCE TO RELATED APPLICATIONS

This application claims priority to Chinese Patent Application No. 201710146510.3 filed on Mar. 13, 2017 the contents of which, are incorporated by reference herein.

FIELD

The subject matter herein generally relates to transmission components.

BACKGROUND

When a printer is used to scan or copy a document, the printer cover is opened so that the document can be placed on the scanning screen, and the cover is pressed against the document before printing or scanning. However, when the cover is closed, especially in confined spaces, a transmission component of the surface of the cover may crush the user's hand, thereby causing a safety hazard.

BRIEF DESCRIPTION OF THE DRAWINGS

Implementations of the present disclosure will now be described, by way of example only, with reference to the attached figures.

DETAILED DESCRIPTION

Figure 1:
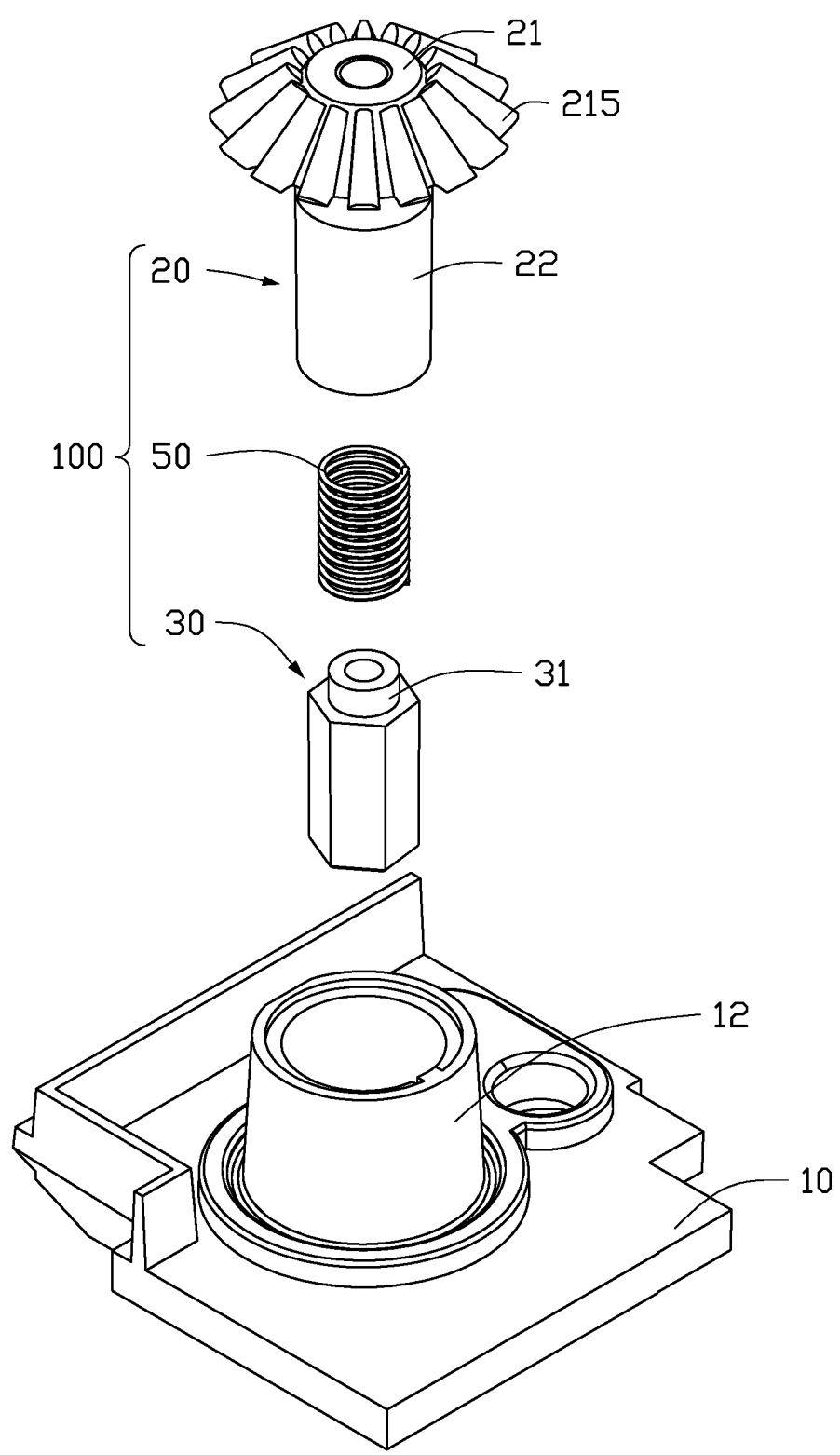
FIG. 1 is an exploded view of an exemplary embodiment of a transmission component and a base.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a transmission component 100 in a printer (not shown). The transmission component 100 can be detachably mounted on a base 10 of the printer. The transmission component 100 includes a gear portion 20, a transmission shaft 30 received in the gear portion 20, and a resilient member 50 secured on the transmission shaft 30.

Figure 2:
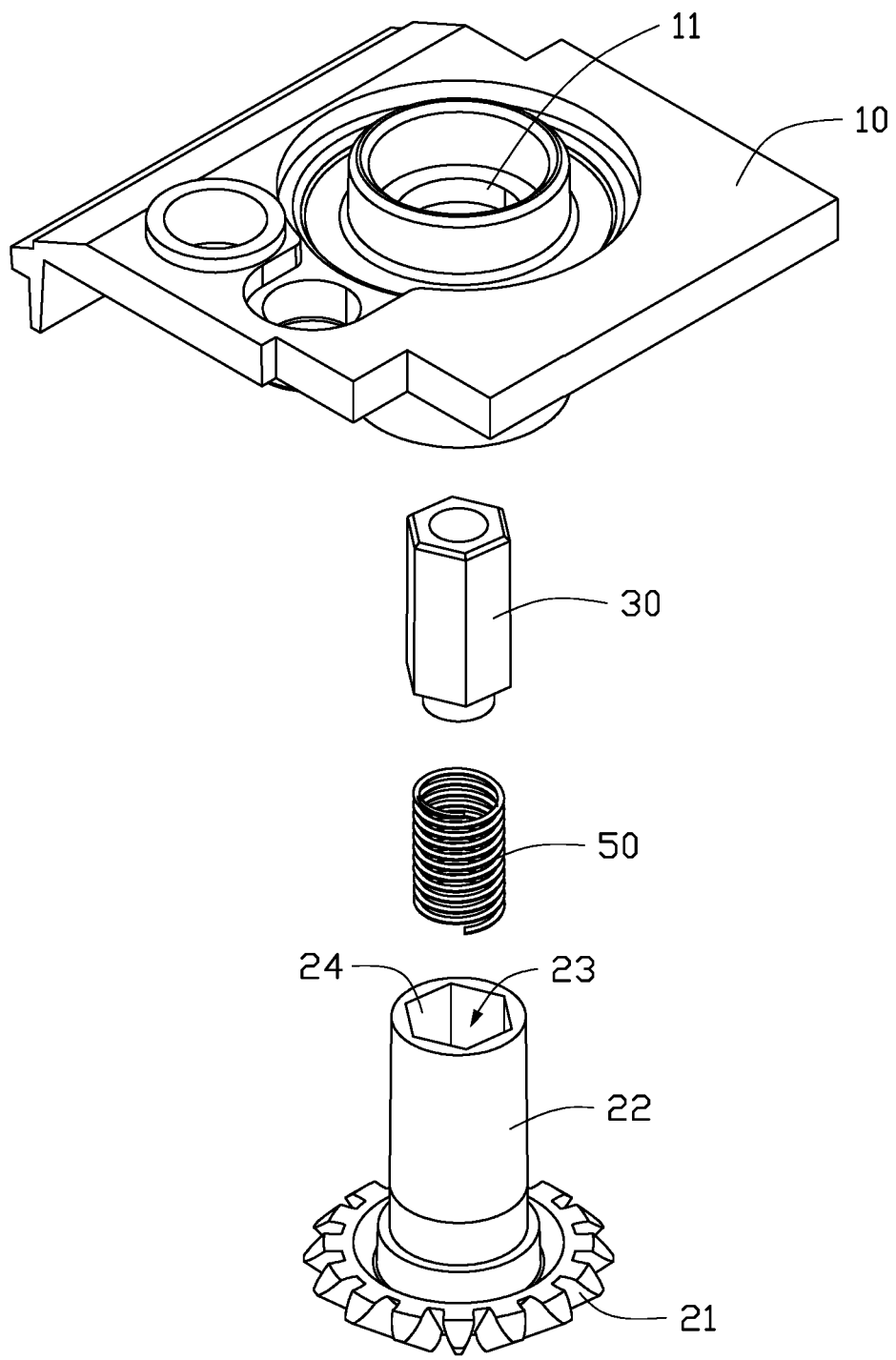
FIG. 2 is similar to FIG. 1, but viewed from another angle.
Figure 3:
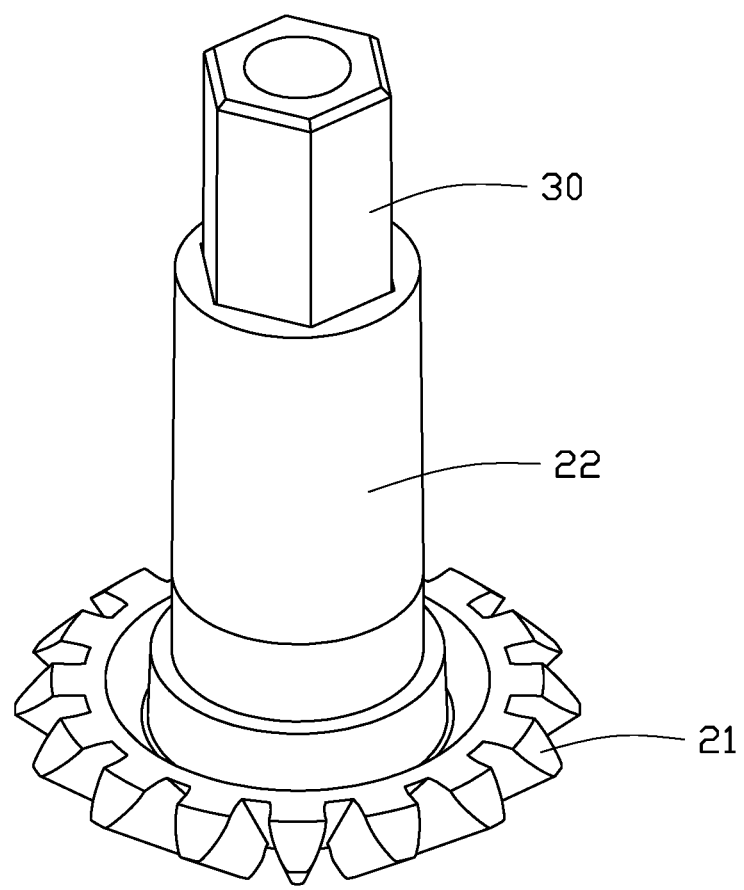
FIG. 3 is an assembled view of the transmission component of FIG. 1.
Figure 4:
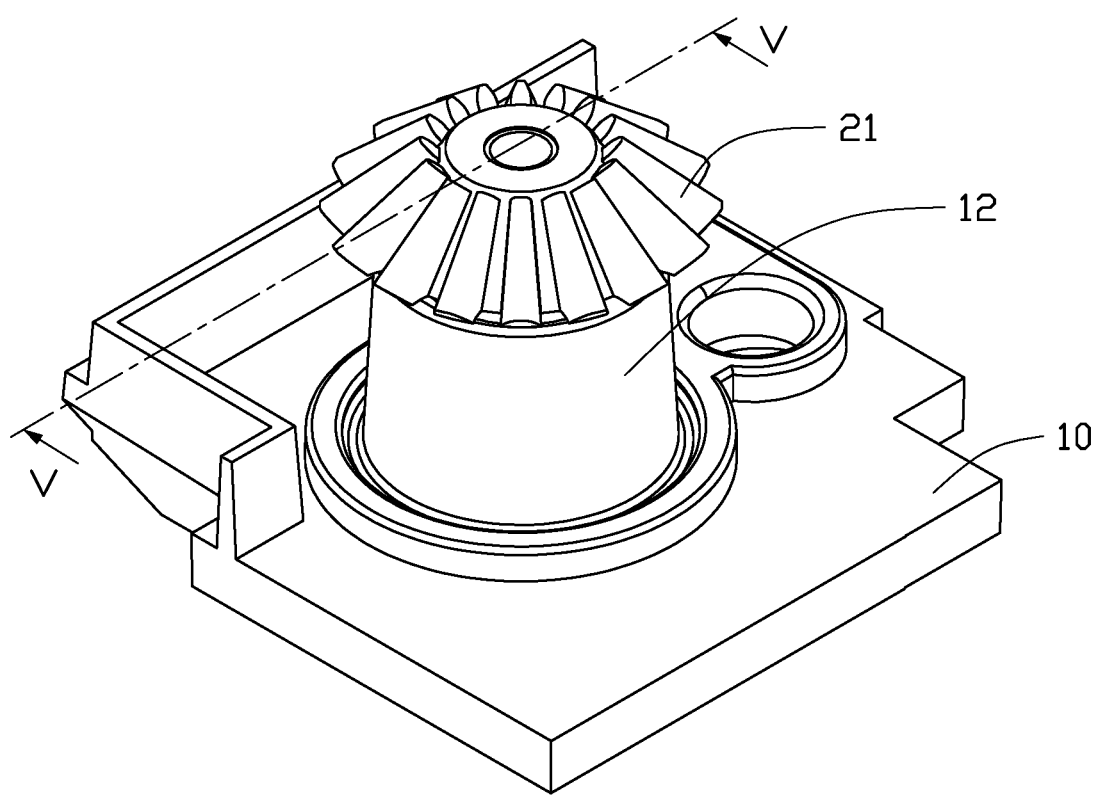
FIG. 4 is an assembled view of the transmission component and the base of FIG. 1.

FIG. 1 and FIG. 2 illustrate that the base 10 defines a through hole 11 and a hollow positioning column 12 surrounding the through hole 11. The transmission component 100 can pass through the through hole 11 and be received in the positioning column 12.

One end of the gear portion 20 defines a bevel gear 21, and a plurality of gear teeth 215 are defined on the bevel gear 21. The gear teeth 215 can be engaged with other components of the printer to transmit power. One end of the gear portion 20 away from the bevel gear 21 includes a supporting rod 22, and a receiving groove 23 is defined inside a portion of the supporting rod 22. One end of the support rod 22 away from the bevel gear 21 defines an opening 24. The transmission shaft 30 and the resilient member 50 can pass through the opening 24 to be received in the receiving groove 23. The supporting rod 22 is received in the positioning column 12 and can be rotated in the positioning column 12.

One end of the transmission shaft 30 includes a protrusion 31, and the protrusion 31 is towards the bevel gear 21 when the transmission shaft 30 is received in the receiving groove 23. There is a large static friction force between the sidewall of the transmission shaft 30 and the inner wall of the receiving groove 23 to prevent the transmission shaft 30 from falling off from the receiving groove 23.

The resilient member 50 can be elastically deformed, and one end of the resilient member 50 is set on the protrusion 31. The resilient member 50 can be received in the receiving groove 23 and the other end of the resilient member 50 abuts against one end of the receiving groove 23 close to the gear portion 20.

FIG. 1 and FIG. 2 illustrate that the supporting rod 22 of the gear portion 20 is inserted into the through hole 11 of the base 10, and the supporting rods 22 are received in the positioning column 12. The gear portion 20 is rotatably mounted on the base 10. One end of the resilient member 50 is set on the protrusion 31. The transmission shaft 30 and the resilient member 50 are inserted into the receiving groove 23 of the gear portion 20 through the opening 24. There is a static friction force between the transmission shaft 30 and the supporting rod 22. Thus, the transmission component 100 is mounted on the base 10.

Figure 5:
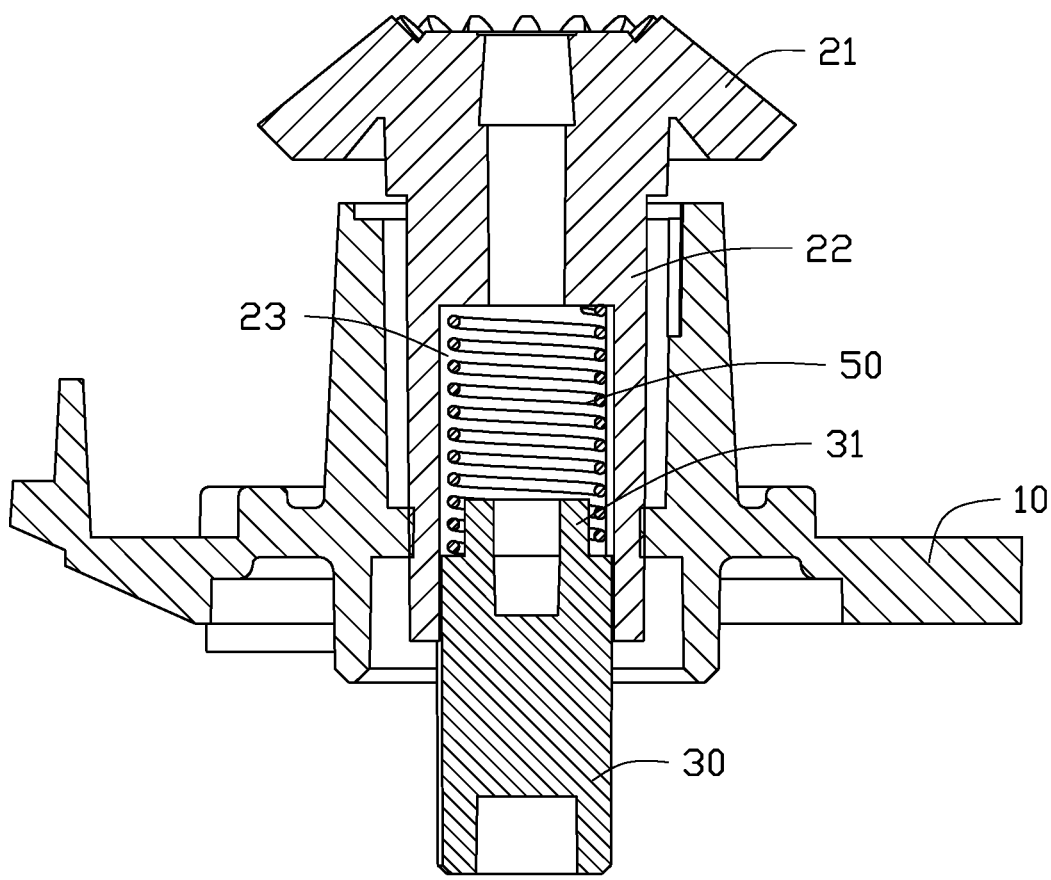
FIG. 5 is a cross-sectional view along a line V-V of FIG. 4.
Figure 6:
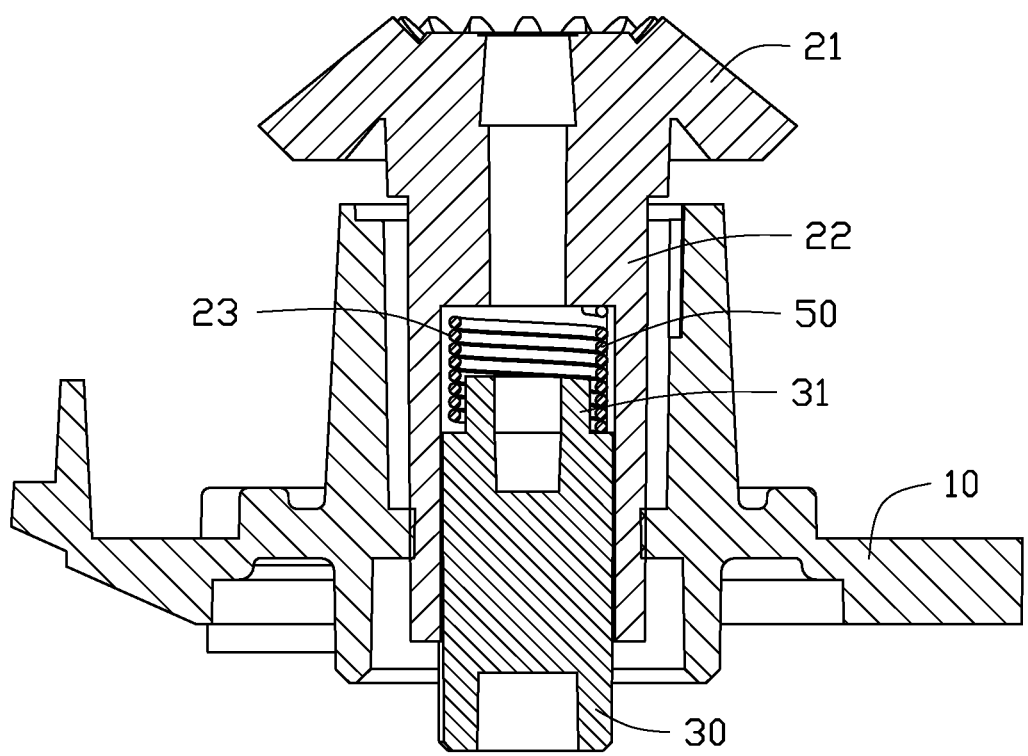
FIG. 6 is similar to FIG. 5, but a resilient member is in a state of compression.

Referring to FIGS. 5 and 6, when a user puts a document into the printer and covers the cover plate, if the transmission component 100 encounters a user's hand or other objects, the transmission shaft 30 drives the resilient member 50. The resilient member 50 is elastically contracted so that the transmission shaft 30 slides in the receiving groove 23 towards the bevel gear 21 until the transmission shaft 30 is completely accommodated in the receiving groove 23. Damage to the user or the printer is thus prevented.

The exemplary embodiments shown and described above are only examples. Many details are often found in the art such as the other features of transmission component and a print. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A printer comprising:
   a base defining a through hole; and
   a transmission component installed on the base, comprising:
      a gear portion passing through the through hole to be installed on the base;
      a transmission shaft, one end of the transmission shaft comprising a protrusion; and
      a resilient member;
   wherein the gear portion has two ends, one end of the gear portion defines a receiving groove, the transmission shaft and the resilient member are received in the receiving groove, the resilient member has two end portions, one of the two end portions of the resilient member abuts a bottom end of the receiving groove and the other one of the two end portions of the resilient member is sleeved on the protrusion of the transmission shaft, the resilient member is elastically deformable such that the transmission shaft is slidable in the receiving space.

2. The printer of claim 1, wherein the end of the gear portion comprises a supporting rod, and the receiving groove is defined in the supporting rod.

3. The printer of claim 2, wherein one end of the supporting rod away from the gear portion defines an opening, the transmission shaft and the resilient member can pass through the opening to be in or out of the receiving groove.

4. The printer of claim 1, wherein the other end of the gear portion comprises a bevel gear, a plurality of gear teeth are defined on the bevel gear.

5. The printer of claim 1, wherein the base defines a hollow positioning column surrounding the through hole, and the transmission component is received in the positioning column.

6. The printer of claim 1, wherein an outer sidewall of the transmission shaft contacts an inner wall of the receiving groove.

* * * * *